United States Patent [19]

Katz et al.

[11] Patent Number: 4,596,748
[45] Date of Patent: Jun. 24, 1986

[54] METHOD FOR REPLACING LOST ELECTROLYTE IN FUEL CELLS

[75] Inventors: Murray Katz, Newington; Harold R. Kunz, Vernon, both of Conn.

[73] Assignee: United Technologies Corporation, Hartford, Conn.

[21] Appl. No.: 599,130

[22] Filed: Apr. 11, 1984

[51] Int. Cl.⁴ ............................................. H01M 8/00
[52] U.S. Cl. ..................................... 429/13; 429/26
[58] Field of Search ............................. 429/13, 14, 26

[56] References Cited

U.S. PATENT DOCUMENTS 4,345,008 8/1982 Breault ................... 429/26

Primary Examiner—Charles F. LeFevour
Attorney, Agent, or Firm—Stephen E. Revis

[57] ABSTRACT

Electrolyte lost from a fuel cell, such as by evaporation, is replenished by introducing electrolyte from an external source into a reactant gas stream being delivered into the cell. The fresh electrolyte is vaporized or formed into droplets as it enters the cell such as by spraying the fresh electrolyte into the gas stream. If the electrolyte vapor pressure in the entering gas stream is made high enough, evaporation of the electrolyte from the cell can be halted or electrolyte can even be added to the cell from the gas stream.

9 Claims, 1 Drawing Figure

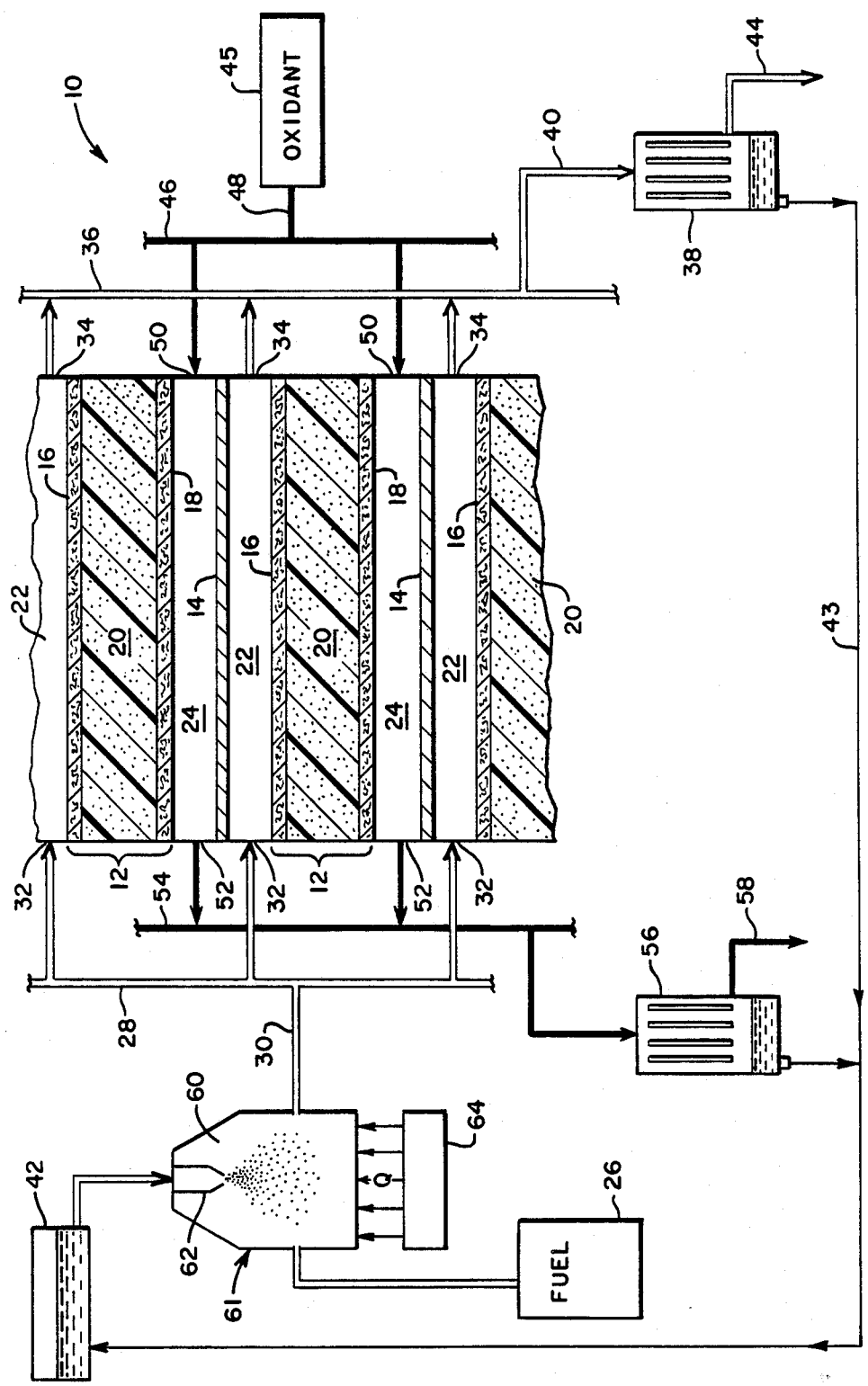

METHOD FOR REPLACING LOST ELECTROLYTE IN FUEL CELLS

DESCRIPTION

1. Technical Field

This invention relates to electrochemical cells which utilize an electrolyte which is liquid during cell operation.

2. Background Art

In electrochemical cells which utilize phosphoric acid electrolyte there is some evaporation of the electrolyte into the reactant gas streams, particularly into the air (oxidant) stream which flows at a significantly greater volume flow rate than the hydrogen (fuel) stream. Although this evaporation is slight, it becomes significant over a long period of time. The problem becomes more severe as cell operating temperatures increase. Electrolyte may also be lost by leakage through seals; and useable electrolyte volume may also diminish over a period of time by absorption into plates which separate adjacent cells. Therefore, for extended periods of operation, it may be required that lost electrolyte either be replenished intermittently or continuously from a separate source of electrolyte, or the lost electrolyte must be recovered and returned to the cell.

One solution to this problem is shown in commonly owned U.S. Pat. No. 4,345,008. In that patent the electrolyte which has evaporated into a reactant gas stream is condensed back into the electrode portion of the cell by cooling the reactant gas stream just before the gas stream leaves the cell. Capillary action and the electrolyte concentration gradient within the electrode results in redistribution of the electrolyte within the cell by bulk flow and/or diffusion within the electrode.

A disadvantage of the invention of U.S. Pat. No. 4,345,008 is the requirement of specially designed fuel cell components, such as electrodes and perhaps intercell coolers. Alternate approaches to solving the electrolyte loss problem are needed which avoid that disadvantage.

DISCLOSURE OF INVENTION

One object of the present invention is a method and apparatus for reducing the loss of electrolyte from a cell caused by evaporation of the electrolyte into a reactant gas stream.

Another object of the present invention is a method for maintaining the electrolyte inventory within a cell substantially constant.

Another object of the present invention is apparatus and a method for replacing electrolyte which has been lost from a fuel cell.

Accordingly, in the method of the present invention electrolyte lost from a fuel cell is replenished from an external source of electrolyte by introducing electrolyte from the source into a reactant gas stream being delivered to the cell, and vaporizing or atomizing that electrolyte such that it is dispersed as a vapor or as droplets within the reactant gas stream as the stream enters the cell.

The electrolyte may be sprayed as a mist into the reactant gas stream and be carried as fine droplets into the cell; or, if the gas stream is hot enough, the droplets will vaporize within the gas stream and enter the cell as a vapor, or partially as a vapor. Alternatively, the gas stream can be heated after the electrolyte is introduced into it in order to vaporize the electrolyte or even supersaturate the gas stream; or the electrolyte can be preheated before introducing it into the gas stream. Either the fuel or oxidant gas stream can be used as the carrier gas.

If the electrolyte enters the cell as a vapor, the vapor provides an electrolyte pressure in the reactant gas to reduce electrolyte evaporation from the fuel cell. If the electrolyte vapor pressure of the entering reactant gas is high enough, evaporation from the cell will be completely eliminated. At even higher vapor pressures the gas stream becomes supersaturated and electrolyte will be added to the cell from the gas stream.

When the electrolyte enters the cell as fine droplets within the gas stream, the droplets will at least partially vaporize due to cell temperatures, and this vapor will provide the same function as discussed above. In addition, some of the droplets will impact on the porous cell components (e.g. electrodes) and be absorbed, thereby replenishing the lost electrolyte. Thus, both vapor and mist introduction into the cell provide a means for eliminating electrolyte loss from and for adding electrolyte to a fuel cell.

The source of electrolyte for purposes of replenishment may simply be fresh electrolyte from a container or it may be electrolyte recovered from the fuel cell exhaust gases, or a combination of both. Electrolyte may be recovered from the exhaust gases may then be separated out of the exhaust gas stream. The separated electrolyte is delivered to an accumulator or storage tank and is returned to the cells by the method described above.

The foregoing and other objects, features and advantages of the present invention will become more apparent in the light of the following detailed description of preferred embodiments thereof as shown in the accompanying drawing.

BRIEF DESCRIPTION OF THE DRAWING

The sole FIGURE is a schematic diagram of a fuel cell system incorporating the features of the present invention.

BEST MODE FOR CARRYING OUT THE INVENTION

Referring to the FIGURE, a fuel cell stack 10 is shown schematically as comprising a plurality of individual fuel cells 12 separated by gas impervious plates 14. The cells of the stack are connected electrically in series. Each fuel cell 12 of the stack 10 comprises a gas porous anode electrode 16 spaced apart from a gas porous cathode electrode 18. Sandwiched between each pair of spaced apart electrodes 16, 18 is a matrix 20 which is saturated with electrolyte. The matrix holds the electrolyte like a sponge. The electrodes may also hold some of the electrolyte. Although not intended to be limited thereto, in this exemplary embodiment the electrolyte is phosphoric acid and the matrix is made from silicon carbide in accordance with the teachings of commonly owned U.S. Pat. No. 4,017,664. The electrodes 16, 18 are of the well known gas diffusion type. Examples of such electrodes are shown and described in commonly owned U.S. Pat. Nos. 4,035,551; 4,185,145; and 4,374,906.

The electrodes 16, 18 and the separator plates 14 are constructed and arranged so as to define fuel gas spaces 22 on the nonelectrolyte facing side of the anode electrode 16 and oxidant gas spaces 24 on the nonelectrolyte facing side of the cathode electrodes 18. For example, as shown in commonly owned U.S. Pat. No. 4,115,627, each of the electrodes 16, 18 may include a plurality of spaced apart parallel ribs on the nonelectrolyte facing side thereof, which ribs extend into contact with the separator plate 14. Reactant gas carrying channels would be defined between adjacent ribs.

Fuel for the cells of this embodiment is a hydrogen containing gas, and the oxidant is air. Although not shown, these reactants are preferably introduced into the stack 10 under pressure, such as 60 psig. This is all well known in the art. (For example, see commonly owned U.S. Pat. No. 4,004,947.)

Referring to the drawing, fuel from a source 26, which may be a steam reforming reactor for producing hydrogen, is introduced into a fuel inlet manifold 28 via a conduit 30. The fuel gas enters the inlets 32 of the fuel gas spaces 22, passes through the cells 12, and is exhausted from fuel gas space outlets 34 into a fuel outlet manifold 36. As the electrochemical reaction takes place within the cells, water and heat are produced as by-products. Some electrolyte evaporates from the cells into the flowing fuel gas, becomes entrained therein, and leaves the stack 10 along with the spent fuel gas.

The fuel gas exhaust stream is then delivered from the outlet manifold 36 through a condenser/separator unit 38 via a conduit 40. In the unit 38 the gas stream is cooled to condense the electrolyte vapor, and the condensed electrolyte is separated from the gas stream. The separated electrolyte may be discarded or, as shown in this embodiment, it is delivered to an electrolyte accumulator 42 by means of a conduit 43. The substantially electrolyte-free fuel gas exhaust stream leaves the condenser/separator unit 38 via a conduit 44. Any unused fuel therein may be consumed elsewhere in the system, and a portion of this unused fuel may even be recirculated through the cells of the stack 10, as is well known in the art.

Oxidant, such as compressed air form a source 45, is introduced into an oxidant inlet manifold 46 via a conduit 48; and from the manifold 48 it is fed into the oxidant gas space inlets 50 of the cells 12. As with the fuel gas, electrolyte evaporates from the cells into the oxidant gas stream as the oxidant passes through the cells. Since the oxidant volume flow rate is typically much greater than the fuel flow rate, more electrolyte evaporates into the oxidant gas stream than into the fuel gas stream. The spent oxidant, with the electrolyte entrained therein, leaves the cells via oxidant gas space outlets 52 and enters an oxidant exhaust manifold 54. From the manifold 54 the oxidant exhaust stream is delivered into and passes through a condenser/separator unit 56, which may be similar to or identical to the condenser/separator unit 38. In the condenser/separator unit 56 the electrolyte vapor is condensed and separated from the spent oxidant gas. As with the electrolyte recovered from the fuel exhaust stream, the separated electrolyte is delivered to the electrolyte accumulator 42 via the conduit 43. The electrolyte-free oxidant exhaust gas stream leaves the condenser/separator unit 56 via a conduit 58 and is eventually vented to the atmosphere. A condenser/separator unit suitable for use in the system of the present invention is shown and described in commonly owned U.S. Pat. No. 4,372,759.

In accordance with the present invention, the separated electrolyte and/or fresh electrolyte may be returned or added to the cells either intermittently or on a continuous basis. In the exemplary embodiment shown in the drawing, gaseous hydrogen from the fuel supply 26 passes into a chamber 60 of a vaporizer 61 in the conduit 30 upstream of the fuel manifold 28. Electrolyte from the accumulator 42 is delivered into the chamber 60 of the vaporizer 61 through a nozzle or atomizer 62 which creates a fine mist of electrolyte. The fine droplets of electrolyte become dispersed and entrained with the flowing hydrogen gas. A burner 64 heats the fuel and electrolyte mist so as to vaporize the electrolyte. The electrolyte laden fuel is then delivered from the chamber 60, into the fuel manifold 28, and thence into and through the fuel gas spaces of the stack 10. Although, in this embodiment, the fuel and electrolyte droplets are shown being heated together in the chamber 60, the burner 64 may not be needed if the fuel entering the chamber 60 is sufficiently hot to vaporize a significant portion of the electrolyte as it is sprayed into the hot fuel stream. Similarly, the electrolyte may be dispersed into the fuel stream at one location, and the mixture location. Also, a heater may instead be used to heat or vaporize the electrolyte before it enters the gas stream such that no significant heating of the gas stream is required thereafter.

In the system shown in the drawing the electrolyte recovered in the condenser/separators 38, 56 is eventually returned to the cells; however, this is not required as part of the present invention. The accumulator 42 may simply be a supply of fresh (unused) electrolyte. In any event, since it is not possible to recover 100% of the electrolyte lost from the cells, some fresh electrolyte will have to be added to the accumulator to make up the difference.

If the electrolyte vapor is to be added to the cells on a continuous basis, the electrolyte/fuel mixture (or electrolyte/oxidant mixture, as the case may be) entering the cells must be either saturated or nearly saturated with electrolyte. Complete saturation is not required at the cell inlets since part of the fuel (and oxidant) is consumed by electrochemical reactions within the cell. Thus, the volume flow rate of each reactant gas is less in the exhaust gas than in the inlet gas, and complete saturation will occur someplace between the inlets and outlets, under the proper conditions. Under conditions of complete saturation, the electrolyte vapor pressure in the gas stream will be the same as the equilibrium vapor pressure inside the cell and further evaporation will cease. A steady state condition will quickly develop within the cells such that the electrolyte volume within the cells remains constant.

If the electrolyte within the cells is to be replenished intermittently, no electrolyte is added to the fuel stream until the electrolyte volume within the cells is reduced to a predetermined level or after a certain number of hours of operating time. Various techniques can be used to determine when electrolyte addition is desirable. To replenish the electrolyte, the incoming electrolyte laden reactant gas stream is supersaturated with electrolyte so that the electrolyte vapor pressure in the gas stream is higher than the equilibrium electrolyte vapor pressure inside the cell. This requires heating the incoming electrolyte laden gas stream to a temperature hotter than the temperature of the cells. Once inside the cells the electrolyte condenses out of the gas stream onto the gas porous electrodes and is wicked, by capillary action, to appropriate areas of the cells 12.

In the fuel cell system shown in the drawing electrolyte is replenished by dispersing it within the fuel gas stream entering the cells. The electrolyte could also be added to the cells via the entering oxidant stream; or both reactant gas streams could be used as vehicles for returning the electrolyte to the cells. It is preferred to use the fuel gas stream since its mass flow rate is much less than the oxidant gas stream, and therefore less energy is required to heat the stream in order to vaporize the electrolyte, if such is desired. On the other hand, the present invention does not require the electrolyte to be in the form of a vapor as it enters the cells with the reactant gas. If sprayed into the gas stream in the form of fine enough droplets, the droplets themselves will be carried into the cells by the reactant gas. Some of these droplets may, however, become vaporized upon entering the cells simply due to the cell temperature; and other droplets will contact the porous cell components and become absorbed thereby. One way to spray electrolyte into a reactant gas is via a plurality of nozzles within the reactant gas manifold.

As previously stated, although the present invention is described with respect to phosphoric acid electrolyte fuel cells, it is not intended to be limited thereto. Conceptually it can be used in any fuel cell system wherein the electrolyte is held within a matrix between gas porous electrodes and is lost, such as by evaporation or otherwise during cell operation. The present invention, for example, could be used with molten carbonate electrolyte fuel cells.

Although the invention has been shown and described with respect to a preferred embodiment thereof, it should be understood by those skilled in the art that other various changes and omissions in the form and detail thereof may be made therein without departing from the spirit and the scope of the invention.

We claim:

1. In a method for operating a fuel cell system comprising at least one fuel cell having a porous cathode electrode, a porous anode electrode, an electrolyte retaining matrix sandwiched between said cathode electrode and anode electrode, wherein electrolyte is lost from said cell during operation, the steps of:
    delivering reactant gas into said cell;
    electrochemically reacting said gas within said cell to produce electric current;
    exhausting the spent reactant gas from said cell; and
    replacing the electrolyte lost from said cell including the steps of providing a supply of replacement electrolyte and delivering electrolyte from said supply into said reactant gas being delivered into said cell and dispersing said electrolyte in said gas, said step of dispersing including vaporizing or atomizing said electrolyte such that it enters said cell entrained within said reactant gas being delivered into said cell.

2. The method for operating a fuel cell system according to claim 1 wherein the step of delivering reactant gas into said cell includes delivering fuel gas to said anode electrode and oxidant gas to said cathode electrode, and said step of dispersing comprises dispersing said vaporized or atomized electrolyte into said fuel gas being delivered to said anode electrode.

3. The method for operating a fuel cell system according to claim 1 wherein the electrolyte dispersed in said gas stream is in the form of a vapor as it enters said cell.

4. The method for operating a fuel cell system according to claim 1 wherein the electrolyte dispersed in said gas stream is in the form of droplets as it enters said cell.

5. The method for operating a fuel cell system according to claim 1 wherein in said system electrolyte evaporates from said cell into a reactant gas stream during cell operation including the steps of:
    condensing electrolyte from said exhausted reactant gas external of said cell;
    separating said condensed electrolyte from said exhausted reactant gas; and
    delivering at least a portion of said separated electrolyte to the supply of electrolyte which is to be delivered into said cell.

6. The method for operating a fuel cell system according to claim 1 wherein said step of dispersing electrolyte into said reactant gas being delivered into said cell includes spraying said electrolyte into said reactant gas and heating said electrolyte to cause said electrolyte to vaporize.

7. The method for operating a fuel cell system according to claim 1, wherein said reactant gas delivered into said cell is substantially completely saturated with electrolyte.

8. The method for operating a fuel cell system according to claim 1, wherein said reactant gas delivered into said cell is supersaturated with electrolyte.

9. The method for operating a fuel cell system according to claim 1, wherein said electrolyte is delivered into said reactant gas and thereupon into said cell on a continuous basis, and the vapor pressure of the electrolyte within the reactant gas is maintained at the equilibrium vapor pressure within the cell.

* * * * *